United States Patent [19]

Gärtner

[11] 4,137,816

[45] Feb. 6, 1979

[54] EXPANSION DOWEL WITH A SETTING CONTROL

[75] Inventor: Karl-Heinz Gärtner, Munich, Fed. Rep. of Germany

[73] Assignee: Hilti Aktiengesellschaft, Schaan, Liechtenstein

[21] Appl. No.: 821,925

[22] Filed: Aug. 4, 1977

[30] Foreign Application Priority Data

Aug. 9, 1976 [DE] Fed. Rep. of Germany ....... 2635806

[51] Int. Cl.$^2$ .......................... F16B 13/06; F16B 31/02
[52] U.S. Cl. ............................................ 85/61; 85/74
[58] Field of Search .................. 85/61, 62, 74, 72, 75, 85/54, 53, 35, 45; 81/52 A R

[56] References Cited

U.S. PATENT DOCUMENTS

| | | | |
|---|---|---|---|
| 1,966,414 | 7/1934 | Main | 85/61 X |
| 2,824,481 | 2/1958 | Johnson | 85/62 |
| 3,027,796 | 4/1962 | Shewmon | 85/61 |
| 3,329,058 | 7/1967 | Cumming | 85/62 |

FOREIGN PATENT DOCUMENTS 633784  2/1962  Italy ............................................ 85/74

*Primary Examiner*—Ramon S. Britts
*Attorney, Agent, or Firm*—Toren, McGeady and Stanger

[57] ABSTRACT

An expansion dowel consists of a sleeve, a tie rod extending through the sleeve with an end support on one end of the tie rod and an expanding body on the other end. The end support can be a bolt head or a nut. By applying torque to the end support the expanding body can be pulled into the sleeve causing it to expand. A jacket laterally encloses the end support in form-locking engagement. The jacket is formed of a destructible material, such as a plastic, which is demolished when a predetermined torque is applied through the jacket to the end support signalling that a certain anchoring force has been achieved.

6 Claims, 4 Drawing Figures

EXPANSION DOWEL WITH A SETTING CONTROL

SUMMARY OF THE INVENTION

The present invention is directed to an expansion dowel including a sleeve, an expanding body to be displaced into the sleeve for expanding it, a tie rod connected to the expanding body and an end support on the tie rod for applying torque to the dowel assembly. Further, the invention is directed to a destructible jacket enclosing the end support for indicating when a desired anchoring force has been achieved by the dowel.

In setting expansion dowels, the dowels are introduced into boreholes of a corresponding diameter. Torque is applied to the working surfaces on an end support of the dowel, that is, a bolt head or nut, and the tie rod pulls the expanding body into the sleeve, spreading the sleeve into anchoring contact with the surface of the borehole. The expanding forces and, accordingly, the anchoring value of the dowel, are directly related to the applied torque. To achieve a certain anchoring value, the tightening of the end support must be effected with at least a certain torque. On the other hand, the torque must not be too great, otherwise the forces acting in the expanding range of the dowel sleeve within the borehole would exceed the strength of the material in which the borehole if formed, with the results that the material would be destroyed and the dowel could not be effectively anchored.

To maintain the applied torque within an upper and lower limit, it has been customary to use so-called torque wrenches set for a certain torque. These expensive and delicate tools, however, are not always available on a construction site or they are improperly handled. Moreover, using a torque wrench to control the torque applied raises the additional problem that different torque values are required for different dowel dimensions.

Therefore, attempts have been made to limit the torque applied by means of features incorporated into the expansion dowel itself. For example, spring washers have been used which are pressed flat when a certain torque is attained. This solution, however, has the disadvantage that the deformation of the spring washer is not easily observable and over-tightening of the dowel cannot be prevented.

Another known solution for the problem has been to provide the end support tie rod with a preset breaking point. In such an arrangement it is no longer possible, in most cases, to loosen the expansion dowel once it is set. Furthermore, the sharp edges formed at the present breaking point represent a hazard and tend to increase corrosion.

The primary object of the present invention is to provide an expansion dowel with a simple and reliable torque setting control.

In accordance with the present invention, the end support on the tie rod, that is, a bolt head or nut, has its working surfaces, that is, the surface through which torque is applied, enclosed with a form-locking jacket. The outer surfaces of the jacket extend in generally parallel relation with the working surfaces of the end support. When a predetermined torque is applied to the end support, the jacket is destroyed or demolished by the forces producing the torque.

When the applied torque reaches the predetermined value, the jacket is destructed and its form-locking engagement with the working surfaces on the end support is obliterated. This result can be felt immediately by an operator applying the torque and can be recognized from the exterior of the dowel without any auxiliary means. Loosening of the expansion dowel is possible, since the working surfaces on the end support are not damaged when the jacket is destroyed.

To achieve great strength, as well as to afford simple manufacturing operations, it is advantageous if the enclosing jacket has a substantially constant wall thickness. The outer shape of the jacket corresponds substantially to the outer cross sectional shape of the end support. The substantially constant wall thickness permits the application of the jacket on the end support in a very simple manner, for example, by dipping the end support repeatedly into a bath of material in liquid form. It is also possible, however, to apply the jacket by spraying or shrinking so that it adapts itself to the form of the end support.

To meet the requirements for the transmission of a predetermined torque so that the jacket is destructed at that particular value, the jacket should have a suitable thickness. It has been found to be preferable if the jacket has a thickness of 0.1 to 0.3 times the diameter of the tie rod on which the end support is mounted. At higher or lower values, satisfactory operation of the dowel assembly cannot be ensured. Due to the resulting differences between the width across the flats on the working surfaces of the end support and on the outer surfaces of the jacket, it is possible, in most cases, to use the width across the flats on a regular two-sided wrench for applying the torque to the outer surfaces of the jacket and for subsequently tightening or loosening the end support, after the jacket has been demolished. It is preferable to use socket wrenches for uniformly stressing the jacket. Accordingly, the number of tools required for setting expansion dowels in accordance with the present invention, can be kept very low and this has a positive effect for using the dowels on a construction site.

To facilitate the attachment of the wrench when the end support is tightened, it is advantageous if the jacket is cap-shaped. With a cap-shaped jacket the outer surface of the end support is enclosed not only about its circumference but also at least in part across its end face directed outwardly away from the borehole in which the dowel is being set. With such an arrangement of the jacket there is the particular advantage that by observing the outer end face it can be determined whether a dowel being set has been tightened with the required torque. Observation of the presence or absence of the jacket can be made easier by the use of color markings.

To assure that the jacket on the end support can withstand high bearing pressures produced in applying torque by way of a wrench, and that the jacket is destructed only when the predetermined torque has been attained, it is advisable if the jacket is made of plastic. Both thermal setting and thermoplastics can be used. Plastic jackets are easy to produce and are also inexpensive. Such jackets are characterized by insensitivity to corrosion and by being light in weight. Additionally, the plastic can be optically adapted to the requirements of suitable fillers, such as glass fibers, glass balls or fiber chips.

The various features of novelty which characterize the invention are pointed out with particularity in the claims annexed to and forming a part of this disclosure. For a better understanding of the invention, its operating advantages and specific objects attained by its use,

DETAILED DESCRIPTION OF THE INVENTION

Figure 1:
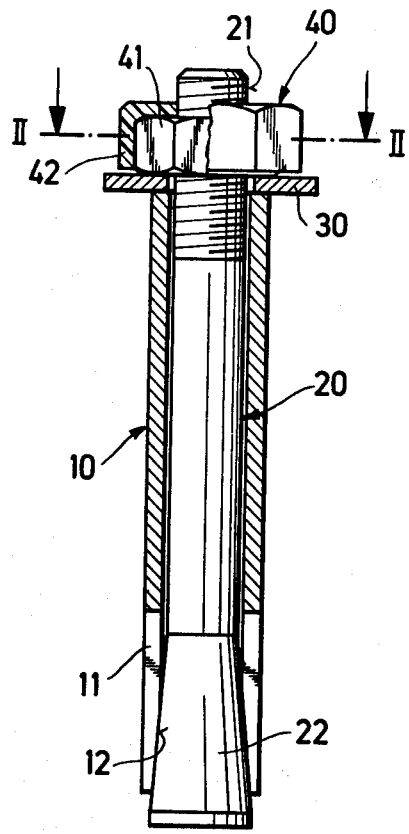
FIG. 1 is a longitudinal side view, partly in section, of an expansion dowel embodying the present invention.

In FIG. 1, an expansion dowel is illustrated and includes a sleeve 10 arranged to be expanded into contact with a borehole in a receiving material, and a tie rod 20 extending axially through the sleeve. Both the sleeve 10 and the tie rod 20 have a leading end, that is, the lower end shown in FIG. 1, which is inserted into a borehole in a receiving material and a trailing end, that is, the upper end which is located at or extends outwardly from the surface of the receiving material into which the dowel is positioned. Extending from the leading end of the sleeve 10 toward its opposite end are elongated slots 11. These slots facilitate the expansion of the sleeve. The tie rod 20 extends through a bore 12 in the sleeve 10 and the leading end of the bore widens conically to the leading end of the sleeve. The tie rod 20 has a thread 21 extending along its trailing end. Formed integrally with the leading end of the tie rod 20 is an expanding body which has a frusto-conical shape widening from the shank of the tie rod extending through the bore 12 to the leading end of the tie rod. By pulling or displacing the expanding body 22 from the leading end toward the trailing end of the bore 12 by means of the thread 21 on the tie rod, the body forces the expansion sleeve 10 radially outwardly into anchoring engagement with the surface of the borehole into which it is inserted. The elongated slots 11 in the expanding range of the sleeve facilitate its widening or expanding action. A washer 30 is located at the trailing end of the sleeve 10 and it encircles the tie rod 20. When the dowel assembly is inserted into a borehole, the washer 30 serves as a depth stop. Screwed onto the thread 21 of tie rod 20 is an end support 40. End support 40 consists of a hexagonal nut 41 screwed onto the thread 21 and a plastic jacket 42 enclosing the circumferential and outer surface of the nut. As can be seen in FIG. 1, the jacket is cap-shaped providing a lateral closure for the nut as well as a cover extending across its outer surface.

Figure 2:
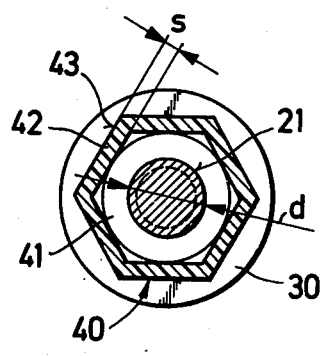
FIG. 2 is a sectional view taken along the line II—II in FIG. 1.

In FIG. 2, a section through the trailing end of the dowel assembly is shown taken along the line II—II in FIG. 1. The hexagonal nut 41 is threaded onto the thread 21 of the tie rod. Enclosing the hexagonal nut 41 is a jacket 42 having a substantially constant wall thickness "s". Outer surfaces 43, disposed in parallel relation with the corresponding flats on the circumference of the nut 41, form the engaging surfaces by which a tool can be engaged with the jacket for transmitting a torque to the nut 41. As shown in FIG. 2, wall thickness "s" of jacket 42 is about 1/5 of the diameter "d" of the tie rod 20. When the torque applied to the surfaces 43 of the jacket exceeds a predetermined limit, jacket 42 is destructed and its form-locking engagement with the outer surface of the nut 41 is obliterated. When the jacket is displaced from the surfaces of the hexagonal nut 41, the nut can be further tightened with a wrench or similar tool. If necessary, the dowel can also be loosened.

Figure 3:
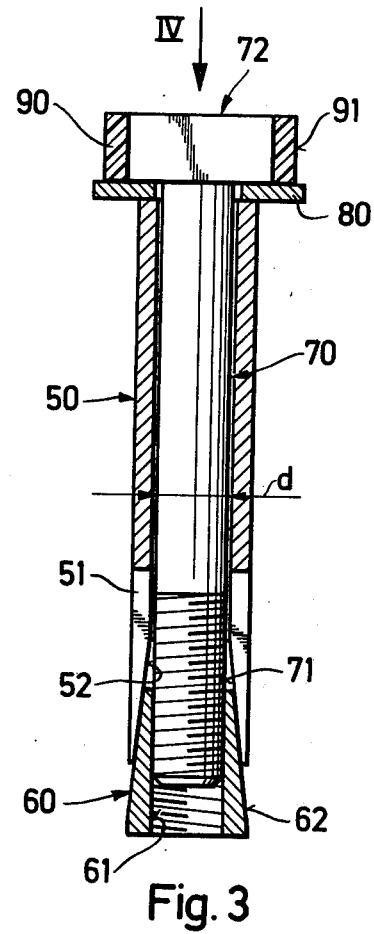
FIG. 3 is a view, similar to that shown in FIG. 1, illustrating another embodiment of an expansion dowel in accordance with the present invention.

In FIG. 3 another embodiment of the dowel assembly incorporating the present invention, is illustrated. The dowel assembly includes a sleeve 50, an expanding body 60 inserted into the leading end of the sleeve, and a tie rod 70 is threaded engagement with the expanding body for pulling the body into the sleeve. To facilitate the expansion of the sleeve 50, axially elongated slots 51 are formed in the sleeve extending from its leading end toward its trailing end. A bore 52 is provided within the sleeve and adjacent its leading end, the bore diverges frusto-conically toward the leading end of the sleeve. Unlike the expanding body 22 in FIG. 1 which is formed integrally with the tie rod 20, in FIG. 3, the expanding body 60 has a female thread 61 screwed onto a thread 71 on the leading end of the tie rod. The outer surface 62 of the expanding body 60 is frusto-conically shaped and arranged to fit into the correspondingly shaped leading end of the bore 52. At its trailing end, the tie rod 70 has an end support or head 72 in the shape of a square as viewed in a plane extending transversely of the axis of the rod. Encircling the tie rod between the trailing end of the sleeve 50 and the juxtaposed surface of the end support 72 is a washer 80. Washer 80 serves as a depth stop when the dowel assembly is inserted into a borehole and also serves to distribute the bearing pressure onto the surface surrounding the borehole when the dowel is tightened. Laterally surrounding the end support 72 is a plastic jacket 90.

Figure 4:
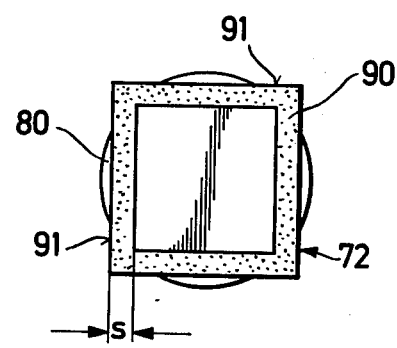
FIG. 4 is an end view of the expansion dowel shown in FIG. 3 taken in the direction of the arrow in FIG. 3.

In FIG. 4, an end view of the trailing end of the dowel assembly of FIG. 3 is provided. End support 72 is square in cross section, that is, as viewed transversely of the axial direction of the tie rod, and it is enclosed laterally about its entire circumference by jacket 90. Wall thickness "s" of jacket 90 is constant and it has a thickness dimension of about ⅕ of the diameter "d" of tie rod 70, note FIG. 3. The outer surface of jacket 90 is provided with surfaces 91 extending in parallel with the outer flat surfaces of the end support or head 72. Torque is applied to the outer surfaces 91 of the jacket 90 for turning the tie rod 70 about its axis. Located between the trailing end of sleeve 50 and the juxtaposed end surface of the end support 72 is a washer 80. When the torque applied to the end support 72 through the jacket 20 exceeds a predetermined limit, the jacket is destructed. With this arrangement the operator tightening the tie rod 70 for expanding the sleeve 50 can note when the predetermined torque has been achieved. When the jacket is displaced from the end support 72, the end support can be used for further tightening or loosening of the dowel assembly.

While specific embodiments of the invention have been shown and described in detail to illustrate the application of the inventive principles, it will be understood that the invention may be embodied otherwise without departing from such principles.

What is claimed is:

1. An expansion dowel comprising an elongated expansion sleeve having a first end and a second end, said sleeve having a bore extending therethrough from the first end to the second end, an axially elongated tie rod extending through the bore in said sleeve from the first and toward the second end, said tie rod having a first end located adjacent the first end of said sleeve and a second end located adjacent the second end of said sleeve, an expanding body connected to the second end of said tie rod and arranged to be pulled into the second end of the bore in said sleeve toward the first end thereof for expanding said sleeve, an end support positioned on the first end of said tie rod and located exteriorly of the first end of said sleeve, said end support having working surfaces extending laterally around the axis of said tie rod for applying torque to said end support, wherein the improvement comprises a jacket laterally enclosing and in form-locking engagement with said working surfaces of said end support, said jacket having working surfaces thereon spaced laterally outwardly from and corresponding to the working surfaces on said end support, said working surfaces on said jacket arranged to be engaged by a tool for applying torque through said jacket to said end support, and said jacket being destructible when a predetermined torque is applied to said working surfaces on said jacket and through said jacket to said end support so that said jacket is displaced from said end support and a tool can then be applied directly to said working surfaces of said end support.

2. An expansion dowel, as set forth in claim 1, wherein said jacket comprises a continuous wall laterally enclosing and in surface contact with the working surface of said end support and said wall having a substantially constant thickness.

3. An expansion dowel, as set forth in claim 2, wherein said wall having a thickness in the range of 0.1 to 0.3 of the diameter of said tie rod.

4. An expansion dowel, as set forth in claim 3, wherein said jacket being cap-shaped and including a second wall extending transversely of said continuous wall and forming a cover for at least a part of the surface of said end support extending transversely of the axis of said tie rod and located more remote from the first end of said sleeve.

5. An expansion dowel, as set forth in claim 4, wherein said jacket being formed of a plastic material.

6. An expansion dowel, as set forth in claim 5, wherein said end support having a regular multi-sided cross section and said jacket having a correspondingly shaped cross section.

* * * * *